United States Patent
Gulistan

[11] 3,749,144
[45] July 31, 1973

[54] CAPTIVE SCREW FOR THIN PANELS
[75] Inventor: Bulent Gulistan, Malibu, Calif.
[73] Assignee: Deutsch Fastener Corp., Los Angeles, Calif.
[22] Filed: Aug. 26, 1971
[21] Appl. No.: 175,056

[52] U.S. Cl. .............................................. 151/69
[51] Int. Cl. ........................................... F16b 41/00
[58] Field of Search ............. 151/69, 41.74; 292/251

[56] References Cited
UNITED STATES PATENTS

| | | | |
|---|---|---|---|
| 3,502,130 | 3/1970 | Gulistan | 151/69 |
| 2,470,927 | 5/1949 | Hale | 151/69 |
| 2,972,367 | 2/1961 | Wootton | 151/69 |
| 2,360,274 | 10/1944 | Rapp | 151/69 |
| 2,709,470 | 5/1955 | Knohl | 151/69 |

FOREIGN PATENTS OR APPLICATIONS

| | | | |
|---|---|---|---|
| 865,205 | 2/1941 | France | 292/251 |

Primary Examiner—Edward C. Allen
Attorney—Richard F. Carr et al.

[57] ABSTRACT

A captive screw device that includes a collar having a relatively thin wall at one end and an exterior shoulder at the other, the bore of the collar having a first cylindrical portion connecting to a second frustoconical portion, a screw extending through the collar with the undersurface of the head complementarily engageable with the surface of the collar at the second portion of the bore, the shank of the collar extending outwardly beyond the collar and receiving a washer, the shank having threads beyond the washer which have a larger major diameter than the opening through the washer for retaining the screw in the collar and preventing substantial relative axial movement, the thin-walled portion of the collar being bendable outwardly into a frustoconical recess to form a flange for securing the collar to a workpiece.

9 Claims, 4 Drawing Figures

Patented July 31, 1973

3,749,144

INVENTOR.
BULENT GULISTAN
BY
ATTORNEY.

CAPTIVE SCREW FOR THIN PANELS

BACKGROUND OF THE INVENTION

1. Field of the Invention

This invention pertains to a captive screw.

2. Description of Prior Art

In the fastener field, it is well recognized that captive screws offer many advantages for certain installations. With the screw permanently retained by the workpiece, it cannot become lost when the fastener is in the separated position. Installation and removal of parts is facilitated, with a saving of time and money. In many instances, it is desired to have the screw perform a jacking function to force the attached elements apart when the fastener is loosened. There have been various satisfactory designs for fasteners of these categories. However, such fasteners have not been applicable to thin panels. This is because it has not been possible to make the sleeve that retains the screw sufficiently short to permit a flange to be formed for retaining the sleeve to the workpiece, while at the same time providing the necessary bore through which the screw can extend. Also, the thin panels would not allow a conventional captive screw device to be recessed adequately to provide a flush installation on the side of the panel where the head of the screw is located.

SUMMARY OF THE INVENTION

The present invention provides a simplified captive screw which can be used successfully with thin panels. The fastener is easily associated with the panel, so that it is held securely and the panel is protected. The fastener can be made as a jacking screw to separate the components when the screw is loosened. Also, the installation of the fastener may be flush at the head end of the screw.

This is accomplished by a fastener that includes a collar having an external shoulder and a bore that is in two sections. One bore section is cylindrical, extending inwardly from one end, while the other is frustoconical providing a converging wall that extends from the inner end of the cylindrical portion to the opposite end of the collar. The end of the collar having the cylindrical bore is relatively thin-walled and bendable. A screw extends through the collar, the screw being of the flush-head type having a frustoconical undersurface that is complementary to the collar at the frustoconical portion of the bore. The head is received within the collar in a position where it is recessed inwardly of the end of the collar. A shank extends from the head beyond the frustoconical bore, with a washer being disposed on the shank. Rolled threads are formed on the shank outwardly of the washer, giving the threads a larger major diameter than the opening through the washer so that the screw is retained by the collar. The threads may extend to where their inner end is in juxtaposition with the washer, whereby the screw is prevented from substantial axial travel relative to the collar. This enables it to accomplish a jacking effect.

When the fastener is attached to a workpiece, the external shoulder of the collar engages the workpiece on one side, while the thin-walled end is bent outwardly into a frustoconical recess on the opposite side of the workpiece. This holds the collar to the workpiece and provides a flush installation at the head end of the screw.

DESCRIPTION OF THE PREFERRED EMBODIMENT

Figure 1:
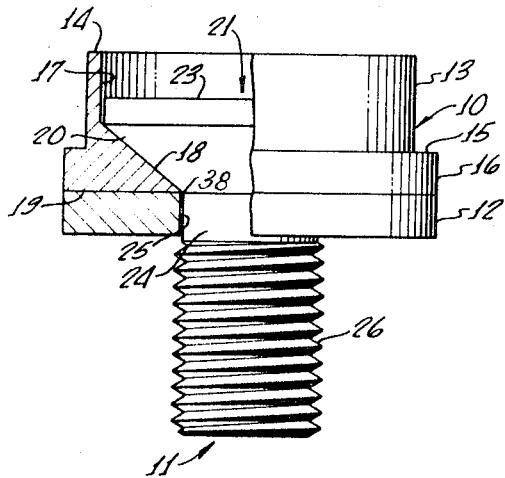
FIG. 1 is a longitudinal sectional view, partially in elevation, of the fastener of this invention.

The fastener of this invention includes a collar 10, a screw 11 and a washer 12. The collar 10 is tubular in configuration, initially made to have a portion 13 of a constant exterior diameter extending from one end 14 to a radial shoulder 15 provided by the inner surface of a flange 16 of larger exterior diameter. Within the collar 10, from an intermediate point to the end 14, the bore section 17 is relatively wide and cylindrical. This provides the collar with a relatively thin circumferential wall between the bore 17 and the exterior portion 13. A frustoconical wall 18 connects to the cylindrical portion 17 of the bore and extends to the opposite end 19 of the collar.

The screw 11 is of the flush-head type, the undersurface 20 of the head 21 being frustoconical and complementary to the frustoconical wall portion 18 of the collar 10. The outside diameter of the outer end of the screw head 21 is substantially equal to the diameter of the bore section 17. A suitable driving slot 22 of any desired configuration is formed in the outer surface 23 of the screw head 21.

The shank 24 of the screw extends outwardly beyond the end 19 of the collar 10. When the screw first is associated with the collar 10, the shank 24 is unthreaded. The washer 12 is fitted on the unthreaded shank 24, the opening 25 of the washer being generally complementary to the shank. After the shank 24 has been extended through both the collar 10 and the washer 12, threads 26 are rolled on its exposed end. The thread rolling provides the threads with a larger major diameter than that of the opening 25 of the washer 12. Consequently, the screw is retained by the assembly of the collar 10 and the washer 12. The threads 26 will engage the washer to prevent removal of the screw in one direction, while the screw head 21 engaging the frustoconical surface 18 of the collar prevents the screw from moving outwardly in the opposite direction. When the fastener is to act as a jacking screw, in the embodiment illustrated, the threads 26 are formed to a position closely adjacent the washer 12, with the screw head engaging the collar surface 18. This means that substantial axial travel of the screw 11 relative to the collar 12 is prevented.

Figure 4:
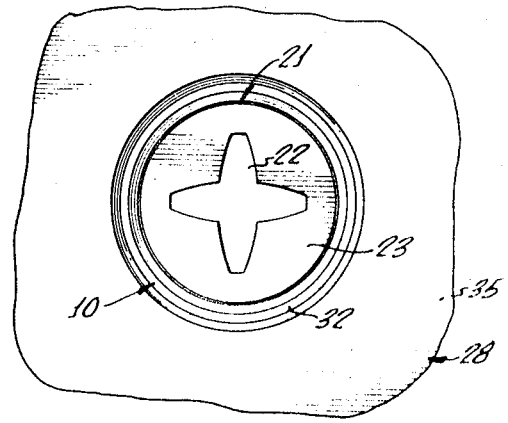
FIG. 4 is a top plan view of the arrangement of FIG. 3.
Figure 2:
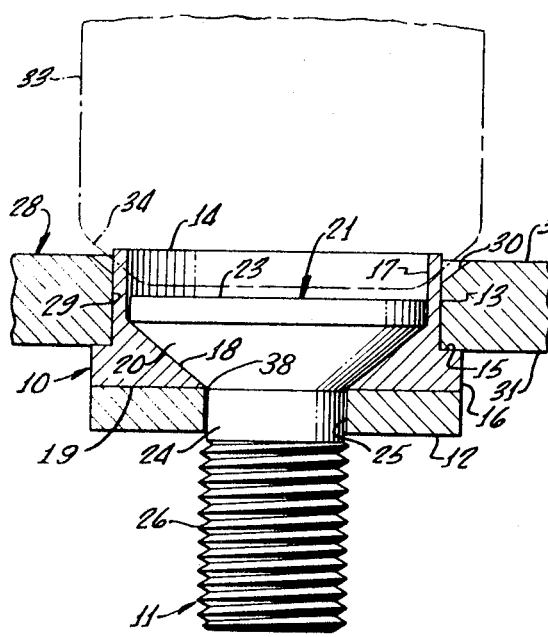
FIG. 2 is a longitudinal sectional view of the fastener associated with a workpiece.
Figure 3:
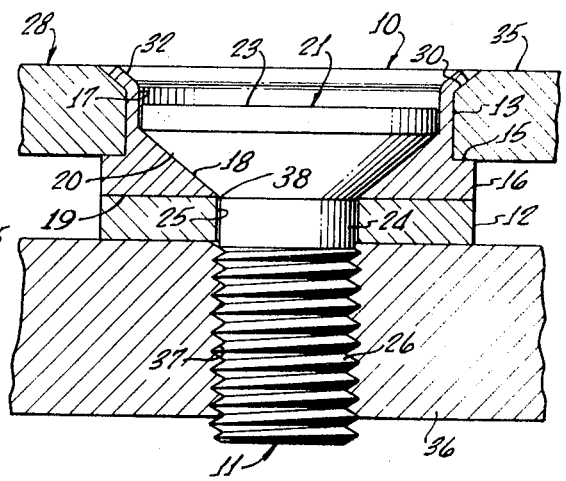
FIG. 3 is a longitudinal sectional view of the fastener attached to the workpiece, with the screw of the fastener engaging a mating part.

The assembled fastener then is ready for attachment to a workpiece, such as the thin panel 28 shown in FIGS. 2 and 3. The panel 28 is provided with an opening 29 through it, which is substantially complementary to the portion 13 of the exterior of the collar 10. A shallow frustoconical recess 30 is formed at one end of the opening 29 in the panel 28. The fastener is associated with the panel 28 by extending the portion 13 of the collar through the opening 29 and bringing the shoulder 15 of the collar into engagement with the surface 31 of the panel 28 opposite from the frustoconical recess 30. With the fastener held in this position, the thin-walled end of the collar 10 is bent outwardly to form a flange 32, as seen in FIG. 4. A suitable tool 33 having a frustoconical surface 34 at its end may be used to enter the thin-walled end of the collar and bend it outwardly into engagement with the frustoconical recess 30 in the panel 28 to form the flange 32. When this is done, the flange 32 cooperates with the shoulder 15 in holding the fastener to the panel 28. The fastener installation is substantially flush at the upper side 35 of the panel 28 because the flange 32 is received in the frustoconical recess 30. The screw 11 becomes attached to the workpiece 28 in this manner, where it is freely rotatable for providing a means for attachment to a mating part. However, with the threads being close to the washer 12, substantial axial travel of the screw 11 relative to the panel 28 is prevented.

The fastener can be used in attaching the panel 28 to any mating part, such as the adjoining element 36 shown in FIG. 4. The part 36 has a threaded opening 37 which receives the threads 26 of the shank of the screw 11.

When the screw 11 is loosened, a jacking effect is realized which will pry the panel 28 relatively away from the part 36. This occurs because the screw 11 is prevented from substantial axial movement relative to the panel 28 and, therefore, upon rotation in loosening its threads will produce a reaction forcing the panel 28 from the part 36. The threads 26 engage the washer 12 adjacent its bore 25 in transmitting the force that accomplishes the separation of the parts. The washer 12 is made of relatively hard material, so that the threads 26 of the screw 11 will not cut into it and will not act as a tap to produce new threads which could allow the screw to escape the collar. On the other hand, the collar 10 is of a more soft and ductile material, which permits the flange 32 to be bent outwardly and firmly engage the recess 30 of the panel 28 to securely hold the collar in place. The juncture of the fructoconical wall 18 and the flat radial end surface 19 results in a sharp edge 38 on the relatively soft collar, which would be particularly susceptible to having threads cut in it by the screw in the absence of the washer 12.

The washer 12 is a continuous annular member so that it is securely held and will not become dislodged from the screw.

The foregoing detailed description is to be clearly understood as given by way of illustration and example only, the spirit and scope of this invention being limited solely by the appended claims.

I claim:

1. A captive screw device comprising
a collar,
said collar having an exterior shoulder facing one end thereof,
and an interior bore,
said bore including a first portion extending from an intermediate position in said collar to said one end of said collar,
said first portion being defined by a first surface which is substantially cylindrical,
said bore including a second portion extending from an intermediate position in said collar to the other end of said collar,
said second portion being defined by a second surface which is substantially frustoconical,
a screw,
said screw having a head receivable in said collar,
said head having a frustoconical undersurface engageable with said second surface of said bore,
said head having an outer surface which is spaced an appreciable distance inwardly of said one end of said collar when said undersurface of said head engages said second surface of said bore,
for thereby providing a substantial length of said collar outwardly of said outer surface of said head,
said screw including a shank extending outwardly beyond said other end of said collar,
and a washer on said shank adjacent said other end of said collar,
said shank having threads thereon outwardly of said washer,
said threads having a larger major diameter than the diameter of the opening through said washer,
whereby said head and said threads prevent said screw from being removed from said collar,
said substantial length of said collar having a relatively thin wall such that it is adapted to be bent outwardly to form a flange for cooperating with said exterior shoulder in holding said collar to a workpiece.

2. A device as recited in claim 1 in which said washer is of relatively hard material, and said collar is of relatively soft material compared with said washer, said collar being ductile for facilitating the outward bending of said one end thereof for forming said flange.

3. A device as recited in claim 2 in which said other end of said collar is a flat surface substantially in a radial plane, whereby a sharp edge is defined at the intersection of said second surface and said other end, and said washer of relatively hard material can prevent said threads from engaging said sharp edge and cutting threads therein.

4. A device as recited in claim 2 in which said undersurface of said head is substantially complementary to said second surface of said bore.

5. A device as recited in claim 2 in which said threads extend inwardly to a position such that, when said undersurface of said head is in engagement with said second surface of said bore, the inner end of said threads is in juxtaposition with said washer, whereby said screw is prevented from substantial axial movement relative to said collar.

6. In combination with a relatively thin workpiece having an opening therethrough, said opening including a cylindrical portion extending inwardly from one end thereof, and a frustoconical portion extending inwardly from the opposite end thereof, a captive screw device, said captive screw device including
a collar,
said collar including a portion having a cylindrical exterior received in said cylindrical portion of said opening,
said collar including an annular exterior shoulder adjacent one end thereof engaging the surface of said workpiece adjacent said one end of said opening.
said collar including an outwardly bent flange at the opposite end thereof substantially complementarily engaging said frustoconical portion of said opening, said collar having a bore including a cylindrical portion inwardly of said flange and a frustoconical portion connected to said cylindrical portion and converging away therefrom, a screw extending through said collar, said screw having a head, said head having an outer surface having a recess therein for rotating said screw relative to said workpiece and a frustoconical undersurface engageable with the surface of said frustoconical portion of said bore, said outer surface of said head being positioned axially inwardly of the base of said flange of said collar when said undersurface of said head engages said frustoconical portion of said bore, said screw having a shank extending outwardly from said one end of said collar, and a washer on said shank, said shank having threads thereon outwardly of said washer, said threads having a larger major diameter than the diameter of the opening through said washer, whereby said head and said threads prevent said washer from separation from said collar.

7. A device as recited in claim 6 in which said frustoconical portion of said bore extends to said one end of said collar.

8. A device as recited in claim 6 in which, when said undersurface of said head engages said surface of said frustoconical portion of said bore, said threads are in juxtaposition with said washer, whereby said screw is prevented from substantial axial movement relative to said collar.

9. A device as recited in claim 6 in which said flange does not extend substantially beyond the surface of said workpiece at said opposite end of said opening, whereby said captive screw device provides a substantially flush installation at said one end of said opening.

* * * * *